(12) United States Patent
Kojima et al.

(10) Patent No.: US 11,724,490 B2
(45) Date of Patent: Aug. 15, 2023

(54) PRINTING APPARATUS AND PRINTING METHOD

(71) Applicant: SEIKO EPSON CORPORATION, Tokyo (JP)

(72) Inventors: Takayoshi Kojima, Nagano (JP); Hiroyuki Ushiama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

(21) Appl. No.: 17/495,845

(22) Filed: Oct. 7, 2021

(65) Prior Publication Data

US 2022/0111637 A1 Apr. 14, 2022

(30) Foreign Application Priority Data

Oct. 9, 2020 (JP) ................................ 2020-171067

(51) Int. Cl.
 *B41J 2/045* (2006.01)
(52) U.S. Cl.
 CPC ....... *B41J 2/04508* (2013.01); *B41J 2/04586* (2013.01)
(58) Field of Classification Search
 CPC ................. B41J 2/04508; B41J 2/04586
 See application file for complete search history.

(56) References Cited

U.S. PATENT DOCUMENTS

| 2014/0139574 A1* | 5/2014 | Asada | B41J 2/2107 |
| | | | 347/9 |
| 2015/0062227 A1* | 3/2015 | Matsumura | H04N 1/52 |
| | | | 347/14 |

FOREIGN PATENT DOCUMENTS

JP 2007-195244 A 8/2007

* cited by examiner

*Primary Examiner* — Thinh H Nguyen
(74) *Attorney, Agent, or Firm* — Global IP Counselors, LLP

(57) ABSTRACT

A printing apparatus includes a head that discharges ink droplets, and a control unit that performs discharge control of the head. When printing a boundary region formed by an end portion of a first image and an end portion of a second image that is lighter than the first image, in discharge control of a specific ink, among a plurality of inks for printing the end portion of the first image, that exhibits lightness, when forming the end portion of the first image, lower than lightness of the end portion of the second image by a predetermined value or more, the control unit performs specific ink discharge control to cause a number of dots per unit area constituting the end portion of the first image to be smaller than a number of dots per unit area constituting a normal portion, of the first image, that is adjacent to the end portion of the first image.

6 Claims, 9 Drawing Sheets

DOT GENERATION RATIO TABLE

| INPUT GRAY SCALE VALUE | DOT GENERATION RATIO (NUMBER OF DOTS GENERATED) | | |
|---|---|---|---|
| | SMALL DOT | MEDIUM DOT | LARGE DOT |
| 0 | s(0) | m(0) | l(0) |
| ⋮ | ⋮ | ⋮ | ⋮ |
| 158 | s(158) | m(158) | l(158) |
| 159 | s(159) | m(159) | l(159) |
| 160 | s(160) | m(160) | l(160) |
| 161 | s(161) | m(161) | l(161) |
| ⋮ | ⋮ | ⋮ | ⋮ |
| 255 | s(255) | m(255) | l(255) |

FIG. 4

PRINTING APPARATUS AND PRINTING METHOD

The present application is based on, and claims priority from JP Application Serial Number 2020-171067, filed Oct. 9, 2020, the disclosure of which is hereby incorporated by reference herein in its entirety.

BACKGROUND

1. Technical Field

The present disclosure relates to a printing apparatus that performs printing by discharging ink droplets and a printing method.

2. Related Art

In known art, such as a printing control apparatus described in JP-A-2007-195244, an inkjet printer is known that prints a full-color image as a result of forming the image by combining ink dots formed by a plurality of chromatic color inks and ink dots formed by black ink.

However, in the case of a printing apparatus that discharges ink droplets to form dots, such as an inkjet printer, landing positions of the ink droplets may become shifted due to various factors. For example, at an edge of a printed image, among a plurality of inks for forming edge pixels, the landing positions of ink droplets of a specific color ink may become shifted and protrude from the edge. In other words, in the printing apparatus of the known art that discharges the ink droplets to perform the printing, there is a problem in that an unintended color may become visible at an edge of a printed image due to the shifting of the landing positions of the ink droplets.

SUMMARY

A printing apparatus according to the present disclosure includes a head configured to discharge an ink droplet, and a control unit configured to perform discharge control of the head. When printing a boundary region formed by an end portion of a first image and an end portion of a second image lighter than the first image, in specific ink discharge control of a specific ink, among a plurality of inks for printing the end portion of the first image, that exhibits lightness, when forming the end portion of the first image, lower than lightness of the end portion of the second image by at least a predetermined value, the control unit performs specific ink discharge control to cause a number of dots per unit area constituting the end portion of the first image to be smaller than a number of dots per unit area constituting a normal portion, of the first image, adjacent to the end portion of the first image.

A printing apparatus according to the present disclosure includes a head configured to discharge an ink droplet, and a control unit configured to perform discharge control of the head. When printing a boundary region formed by an end portion of a first image and an end portion of a second image lighter than the first image, in specific ink discharge control of a specific ink, among a plurality of inks for printing the end portion of the first image, that exhibits lightness, when forming the end portion of the first image, lower than lightness of the end portion of the second image by at least a predetermined value, the control unit performs specific ink discharge control to cause a number of dots per unit area of a predetermined dot size constituting the end portion of the first image to be larger than a number of dots per unit area of the predetermined dot size constituting a normal portion, of the first image, adjacent to the end portion of the first image, and the predetermined dot size is a dot size when a landing position of the ink droplet is adjusted.

A printing method according to the present disclosure is a printing method for performing printing using a discharged ink droplet, and the method includes, when printing a boundary region formed by an end portion of a first image and an end portion of a second image lighter than the first image, causing a number of dots per unit area constituting the end portion of the first image to be smaller than a number of dots per unit area constituting a normal portion, of the first image, adjacent to the end portion of the first image, in discharge of a specific ink, among a plurality of inks for printing the end portion of the first image, that exhibits lightness, when forming the end portion of the first image, lower than lightness of the end portion of the second image by at least a predetermined value.

A printing method according to the present disclosure is a printing method for performing printing using a discharged ink droplet, and the method includes, when printing a boundary region formed by an end portion of a first image and an end portion of a second image lighter than the first image, causing a number of dots per unit area of a predetermined dot size constituting the end portion of the first image to be larger than a number of dots per unit area of the predetermined dot size constituting a normal portion, of the first image, adjacent to the end portion of the first image, in discharge of a specific ink, among a plurality of inks for printing the end portion of the first image, that exhibits lightness, when forming the end portion of the first image, lower than lightness of the end portion of the second image by at least a predetermined value. The predetermined dot size is a dot size when a landing position of the ink droplet is adjusted.

BRIEF DESCRIPTION OF THE DRAWINGS

FIG. 4 is an explanatory diagram of a dot generation ratio table.

DESCRIPTION OF EXEMPLARY EMBODIMENTS

1. Embodiment

Figure 1:
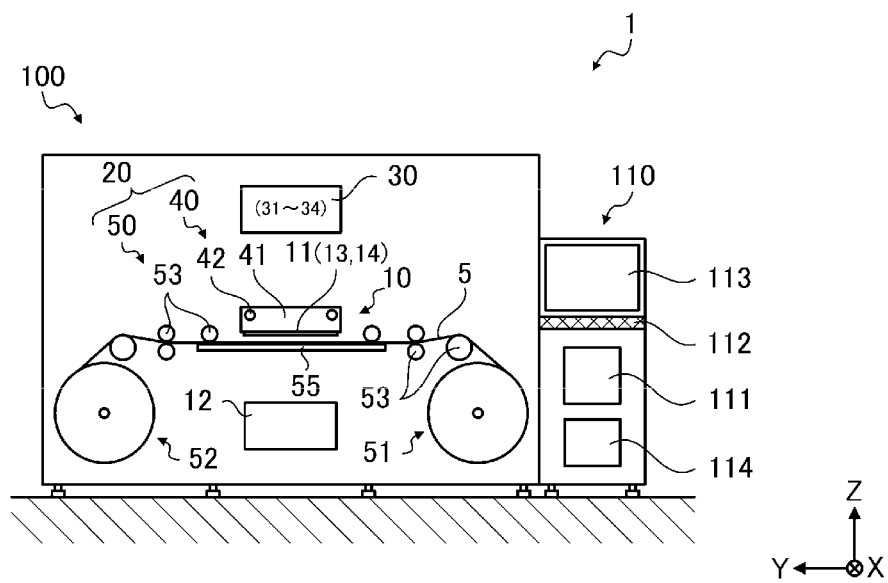
FIG. 1 is a front view illustrating a configuration of a printing apparatus according to an embodiment.
Figure 2:
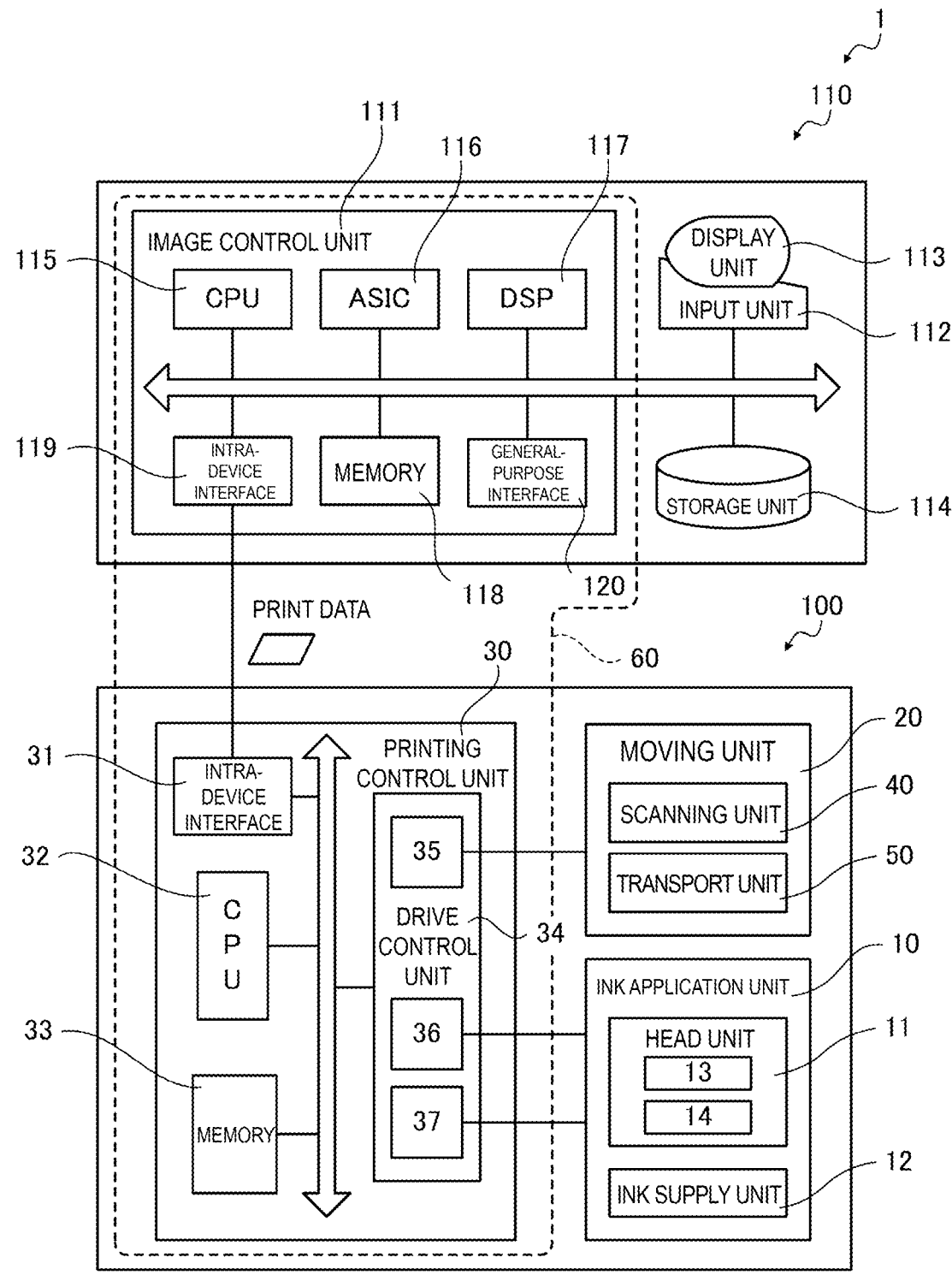
FIG. 2 is a block diagram illustrating the configuration of the printing apparatus according to the embodiment.

First, a configuration of a printing apparatus 1 according to an embodiment will be described with reference to FIG. 1 and FIG. 2.

Note that, with respect to coordinates given in the drawings, it is assumed that a Z-axis direction is an up-down direction, a positive Z direction is an upward direction, an X-axis direction is a front-rear direction, a negative X direction is a frontward direction, a Y-axis direction is a left-right direction, a positive Y direction is a leftward direction, and an X-Y plane is a horizontal plane.

The printing apparatus 1 is configured by a printing unit 100, and an image processing unit 110 coupled to the printing unit 100.

The printing unit 100 is an inkjet printer that, based on print data received from the image processing unit 110, prints a desired image on a long printing medium 5 set in a state of being wound in a roll shape.

The image processing unit 110 includes an image control unit 111, an input unit 112, a display unit 113, a storage unit 114, and the like, and controls print jobs for causing the printing unit 100 to perform printing. Further, the image processing unit 110 generates the print data for causing the printing unit 100 to print the desired image based on the image data.

Software run by the image processing unit 110 includes general image processing application software for handling the image data to be printed, and printer driver software for controlling the printing unit 100 and generating the print data for causing the printing unit 100 to perform the printing. In the following description, the image processing application software will be simply referred to as an image processing application, and the printer driver software will be simply referred to as a printer driver.

Here, the image data is RGB digital image information including text data, full-color image data, and the like.

The image control unit 111 includes a CPU 115, an ASIC 116, a DSP 117, a memory 118, an intra-device interface 119, a general-purpose interface 120, and the like, and manages the entire printing apparatus 1 in a centralized manner. CPU is an abbreviation for Central Processing Unit, ASIC is an abbreviation for Application Specific Integrated Circuit, and DPS is an abbreviation for Digital Signal Processor. The input unit 112 is an information input unit that serves as a user interface. Specifically, the input unit 112 is, for example, a keyboard, a mouse pointer, and the like.

The display unit 113 is an information display unit that serves as a user interface, and displays information input from the input unit 112, images to be printed by the printing unit 100, information relating to the print jobs, and the like, under the control of the image control unit 111.

The storage unit 114 is a rewritable storage medium such as a hard disk drive or a memory card, and stores programs run by the image control unit 111, which are used as the software run by the image processing unit 110, the images to be printed, the information relating to the print jobs, and the like.

The memory 118 is a storage medium that secures a region for storing programs run by the CPU 115, a work region in which such programs run, and the like, and includes storage elements such as a RAM and an EEPROM. RAM is an abbreviation for Random Access Memory, and EEPROM is an abbreviation for Electrically Erasable Programmable Read-Only Memory.

The general-purpose interface 120 is an interface to which an external electronic device can be coupled, and is, for example, a LAN interface, a USB interface, or the like. LAN is an abbreviation for Local Area Network, and USB is an abbreviation for Universal Serial Bus.

The printing unit 100 is configured by an ink application unit 10, a moving unit 20, a printing control unit 30, and the like. The printing unit 100 that has received the print data from the image processing unit 110 uses the printing control unit 30 to control the ink application unit 10 and the moving unit 20 based on the print data, and prints an image on the printing medium 5.

The print data is image formation data obtained by converting the image data, using the image processing application and the printer driver included in the image processing unit 110, so that the printing unit 100 can print the image data, and includes a command for controlling the printing unit 100.

The ink application unit 10 is configured by a head unit 11, an ink supply unit 12, and the like.

The moving unit 20 is configured by a scanning unit 40, a transport unit 50, and the like.

The scanning unit 40 is configured by a carriage 41, a guide shaft 42, a carriage motor, and the like. The carriage motor is omitted from the drawings.

The transport unit 50 is configured by a supply unit 51, a printing medium storage unit 52, transport rollers 53, a platen 55, and the like.

The head unit 11 includes a head 13 provided with a plurality of nozzle rows, in each of which a plurality of nozzles for discharging a printing ink as ink droplets are disposed in a row, and a head control unit 14. The head unit 11 is mounted on the carriage 41, and reciprocates in the X-axis direction along with the carriage 41 that moves in the X-axis direction, which is a scanning direction.

The ink supply unit 12 includes an ink tank, and an ink supply path through which an ink is supplied from the ink tank to the head 13. The ink tank and the ink supply path are omitted from the drawings.

As the ink, a four color ink set is used that is obtained by adding black (K) to a three color ink set of cyan (C), magenta (M), and yellow (Y).

Note that the ink is not limited to those four color inks. Examples of the ink also include an eight color ink set that is obtained by adding, to the four color ink set, an ink set of light cyan, light magenta, light yellow, and light black, which are obtained by reducing the concentration of the respective color materials.

The ink tank, the ink supply path, and an ink supply channel that leads to the nozzles that discharge the same ink are provided separately for each of the inks.

The moving unit 20, namely, the scanning unit 40 and the transport unit 50, cause the printing medium 5 to relatively move with respect to the head 13 under the control of the printing control unit 30.

The guide shaft 42 extends in the X-axis direction, and supports the carriage 41 in a state in which the carriage 41 is able to be in sliding contact with the guide shaft 42. Further, the carriage motor serves as a driving source for causing the carriage 41 to reciprocate along the guide shaft 42. In other words, the scanning unit 40 causes the carriage 41, that is, the head 13, to move in the X-axis direction along the guide shaft 42 under the control of the printing control unit 30. The head 13, which is provided in the head unit 11 mounted on the carriage 41, discharges the ink droplets onto the printing medium 5 supported by the platen 55, while moving in the X-axis direction, under the control of the printing control unit 30. As a result, a plurality of dot rows extending along the X-axis direction are formed on the printing medium 5.

Note that, in this embodiment, the image control unit 111 and the printing control unit 30 configure a control unit 60 that controls the head 13 and the moving unit 20 based on the image data to perform the printing. In other words, the control unit 60 performs discharge control of the head 13, and a relative movement control of the head 13 with respect to the printing medium 5.

The supply unit 51 rotatably supports a reel on which the printing medium 5 is wound in the roll shape, and the supply unit 51 feeds the printing medium 5 onto a transport path. The printing medium storage unit 52 rotatably supports a reel that takes up the printing medium 5, and takes up, from the transport path, the printing medium 5 on which the printing is complete.

The transport rollers 53 include a driving roller that causes the printing medium 5 to move along an upper surface of the platen 55 in the Y-axis direction, a driven roller that rotates in accordance with the movement of the printing medium 5, and the like, and configure the transport path for transporting the printing medium 5 from the supply unit 51 to the printing medium storage unit 52 via a printing region of the ink application unit 10. The printing region is a region in which the head 13 moves in the X-axis direction on the upper surface of the platen 55.

The printing control unit 30 includes an intra-device interface 31, a CPU 32, a memory 33, a drive control unit 34, and the like, and controls the printing unit 100.

The intra-device interface 31 is coupled to the intra-device interface 119 of the image processing unit 110, and transmits and receives data between the image processing unit 110 and the printing unit 100.

The CPU 32 is an arithmetic processing unit for controlling the entire printing unit 100.

The memory 33 is a storage medium that secures a region for storing programs run by the CPU 32, a work region in which such programs run, and the like, and includes storage elements such as a RAM and an EEPROM.

The CPU 32 controls the ink application unit 10 and the moving unit 20 via the drive control unit 34 in accordance with the programs stored in the memory 33 and the print data received from the image processing unit 110.

The drive control unit 34 includes firmware that is run under the control of the CPU 32, and controls driving of the head unit 11 and the ink supply unit 12 of the ink application unit 10, and of the scanning unit 40 and the transport unit 50 of the moving unit 20. The drive control unit 34 is configured by drive control circuits including a movement control signal generating circuit 35, a discharge control signal generating circuit 36, and a drive signal generating circuit 37, a ROM and a flash memory incorporating the firmware for controlling those drive control circuits, and the like. The ROM and the flash memory incorporating the firmware for controlling the drive control circuits are omitted from the drawings. Here, ROM is an abbreviation for Read-Only Memory.

The movement control signal generating circuit 35 is a circuit that generates signals for controlling the scanning unit 40 and the transport unit 50 of the moving unit 20 based on the print data, in accordance with an instruction from the CPU 32.

The discharge control signal generating circuit 36 is a circuit that generates head control signals for selecting the nozzle for discharging the ink, selecting an amount of the ink to be discharged, and controlling the discharge timing, and the like based on the print data, in accordance with an instruction from the CPU 32.

The drive signal generating circuit 37 is a circuit that generates drive signals for driving a pressure generating chamber provided in the head 13.

According to the configuration described above, the printing control unit 30 prints a desired image on the printing medium 5 by repeating, with respect to the printing medium 5 supplied to the printing region by the transport rollers 53, an operation of discharging the ink droplets from the head 13 while moving the carriage 41 supporting the head 13 along the guide shaft 42 in the X-axis direction, and an operation of moving, using the transport rollers 53, the printing medium 5 in the positive Y-axis direction intersecting the X-axis direction.

The printing on the printing medium 5 is started by transmitting the print data to the printing unit 100 from the image processing unit 110. The print data is generated by the printer driver.

Figure 3:
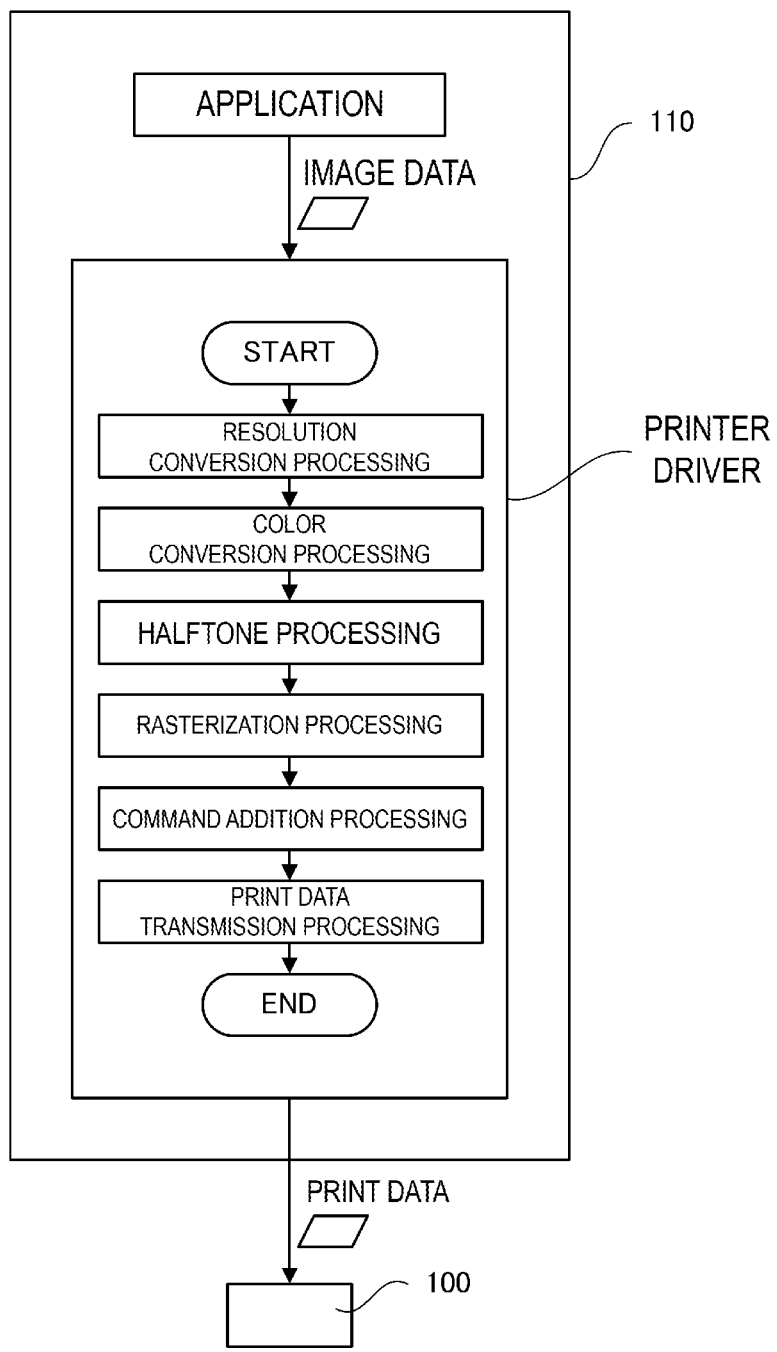
FIG. 3 is an explanatory diagram of basic functions of a printer driver.

Print data generation processing performed by the printer driver will be described below with reference to FIG. 3.

The printer driver receives the image data from the image processing application, converts the image data into the print data of a format that can be interpreted by the printing unit 100, and then outputs the print data to the printing unit 100. When converting the image data from the image processing application into the print data, the printer driver performs resolution conversion processing, color conversion processing, halftone processing, rasterization processing, command addition processing, and the like.

The resolution conversion processing is processing for converting the image data output from the image processing application into a resolution used when printing the image data on the printing medium 5. For example, when the printing resolution is specified as 720×720 dpi, the image data of a vector format received from the image processing application is converted into image data of a bitmap format having the 720×720 dpi resolution. Each pixel data of the image data after the resolution conversion processing is formed by pixels arranged in a matrix pattern. Each of the pixels has a gray scale value, for example, in 256gray scales of the RGB color space. In other words, each piece of the pixel data after the resolution conversion indicates the gray scale value of the corresponding pixel. Hereinafter, the gray scale value data of the RGB color space is referred to as RGB data.

The pixel data corresponding to one row of the pixels aligned in a predetermined direction, of the pixels arranged in the matrix pattern, is called raster data. Note that the predetermined direction in which the pixels corresponding to the raster data are aligned corresponds to a direction in which the head 13 moves when printing an image, more specifically, to the X-axis direction.

The color conversion processing is processing for converting the RGB data of the image data into gray scale value data of the CMYK color space. CMYK colors are cyan, magenta, yellow, and black, and the image data of the CMYK color space is data corresponding to the colors of the inks included in the printing unit 100. Therefore, when the printing unit 100 uses the four types of ink of the CMYK color system, the printer driver generates image data of a four-dimensional space of the CMYK color system, based on the RGB data. The gray scale value data of the CMYK color space is more specifically ink amount data. Hereinafter, the gray scale value data of the CMYK color space is referred to as CMYK data.

This color conversion processing is performed based on a color conversion look-up table in which the gray scale values of the RGB data and the gray scale values of the CMYK data are associated with each other. Note that the pixel data after the color conversion processing is, for example, the CMYK data of 256gray scales expressed in the CMYK color space.

The halftone processing is processing for converting data based on a large number of gray scales, for example, data based on 256gray scales, into data based on a number of gray scales that can be formed by the printing unit 100. Through this halftone processing, the data expressing the 256gray scales is converted into 2-bit halftone data expressing four gray scales of no dot, a small dot, a medium dot, and a large dot. Specifically, a dot generation ratio corresponding to the gray scale value is determined from a dot generation ratio table in which the gray-scale values from 0 to 255 are associated with the dot generation ratios, respectively. As the dot generation ratios determined in correspondence to the gray scale values, the dot generation ratio for each of the no dot, the small dot, the medium dot, and the large dot is determined. The pixel data is generated such that the dots are formed in a dispersed manner, using a dither method, an error diffusion method, and the like, at the respective dot generation ratios that have been determined.

Figure 5:
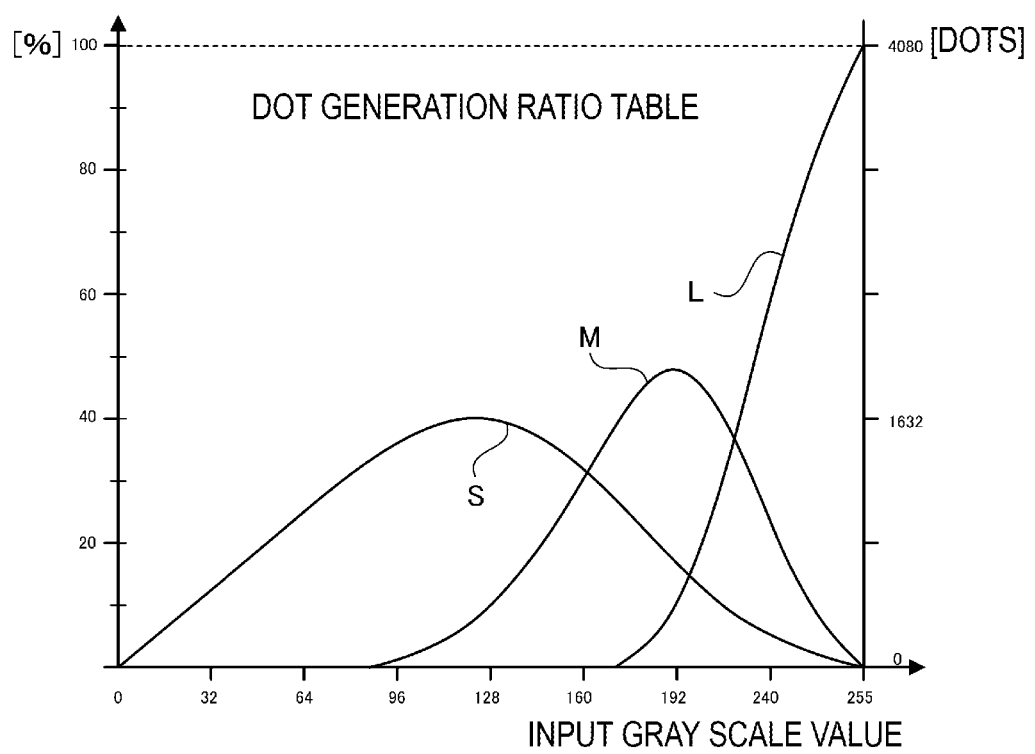
FIG. 5 is an explanatory diagram in which the dot generation ratio table is illustrated as a graph.

As illustrated in FIG. 4 and FIG. 5, the dot generation ratio table is a table that associates the gray scale value for each of the pixels included in the image data with the dot generation ratio for each dot size of the dots formed on the printing medium 5 by the printing unit 100, and the dot generation ratio table is stored in the memory 33 in the printing unit 100 for each of the ink colors. An ink discharge amount is the sum of products of the discharged amount per dot for each of the dot sizes and the number of dots generated.

A horizontal axis of a graph illustrated in FIG. 5 represents the gray scale value indicated by the pixel data, a left vertical axis of the graph represents the dot generation ratio, and a right vertical axis of the graph represents the number of dots generated. Further, S denotes the small dots, M denotes the medium dots, and L denotes the large dots.

The dot generation ratio at a certain gray scale value i means a ratio of the pixels at which the dots are formed, of the pixels belonging to a unit region on the printing medium 5, when all of the pixel data corresponding to the unit region indicates the gray scale value i. Similarly, the number of dots generated for the certain gray scale value i means the number of dots formed in the unit region on the printing medium 5, when all of the pixel data corresponding to the unit region indicates the input gray scale value i.

The rasterization processing is processing for rearranging the above-described 2-bit pixel data arranged in the matrix pattern, in accordance with a dot formation order used at the time of printing. The rasterization processing includes pass allocation processing for allocating the image data constituted by the pixel data obtained after the halftone processing, to each pass in which the head 13 discharges the ink droplets while moving in the X-axis direction. Once the pass allocation processing is completed, the actual nozzles that form each of the raster lines constituting the print image are allocated.

The command addition processing is processing for adding command data corresponding to a printing system, to the data obtained after the rasterization processing. The command data is, for example, transport data relating to transport specifications of the printing medium 5. The transport specifications are, for example, the amount and velocity of the movement of the printing medium 5 in the transport direction on the upper surface of the platen 55, and the like.

The above-described series of processing by the printer driver is performed by the ASIC 116 and the DSP 117 under the control of the CPU 115. Then, in print data transmission processing, the print data generated by the above-described series of processing is transmitted to the printing unit 100 via the intra-device interface 119.

Here, landing positions at which the ink droplets discharged from the nozzles land on the printing medium 5, that is, positions at which the dots are formed by the ink droplets, change depending on a timing at which the head 13 discharges the ink droplets, positions of the nozzles that discharge the ink droplets, a relative movement velocity of the head 13 with respect to the printing medium 5, a discharge velocity of the ink droplets, a distance from the head 13 to the printing medium 5, a direction in which the ink droplets are discharged, transport accuracy of the printing medium 5, and the like. The greater the variations in the landing positions of the ink droplets, that is, the greater the degree of shift from predetermined landing positions, the lower the printing quality. Therefore, it is preferable to evaluate a state of the variations in the landing positions under set printing conditions in advance, and to correct the discharge timing of the ink droplets, an operation amount of each of the operating units, and the like in order to reduce the variations.

In this embodiment, when correcting the shift in the landing positions, the shift in the landing positions is corrected by evaluating formation positions of the large dots formed by the large ink droplets, among the dot sizes of the small dot, the medium dot, and the large dot, since the large dots have a larger impact on the printing quality in terms of the shift in the landing positions and are less susceptible to an influence from the printing environment, such as an influence from an air flow in the printing region.

However, since it is difficult to completely eliminate the shift in the landing positions of the ink droplets, when attempting to perform the printing at a higher resolution and at a higher speed with respect to the printing medium 5 of a larger size, a desired printing quality may not be achieved due to the shift in the landing positions. For example, at an edge of a printed image, only the ink droplets of a specific color ink among a plurality of inks for forming edge pixels may shift from the predetermined landing positions and may protrude from the edge. As a result, an unintended color may become visible at the edge of the printed image.

This will be described in detail below.

Figure 6:
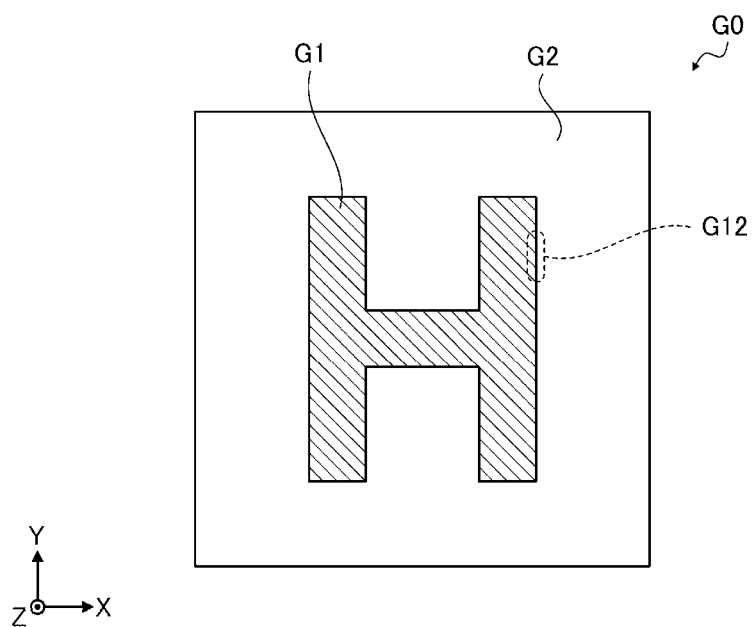
FIG. 6 is a schematic view illustrating an example of a printed image.

An image G0 illustrated in FIG. 6 is an example of an image printed on the printing medium 5 in the printing region, and includes a first image G1 representing a character H and a second image G2 surrounding the periphery of the first image G1. The first image G1 is a darker color image than the second image G2, and the second image G2 is a light-colored solid image that serves as a background of the first image G1.

Note that when the printing medium 5 is white or light-colored, which includes the description to be given below, the second image G2 may be an image having the original white color of the printing medium 5 onto which no ink is applied.

Figure 7:
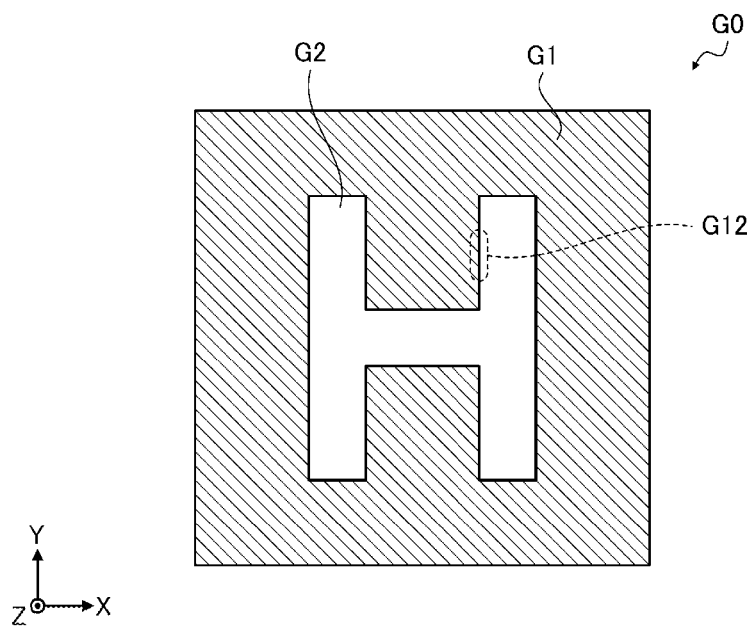
FIG. 7 is a schematic view illustrating another example of the printed image.

Further, as illustrated in FIG. 7, the image representing the character H may be an image representing a light-colored outline character against a dark-colored solid image as the background. In this case, the image G0 is formed by the second image G2 representing the character H and the first image G1 surrounding the periphery of the second image G2. The first image G1 is a darker color image than the second image G2, and the second image G2 is a lighter color image than the first image G1.

Hereinafter, for ease of explanation, while assuming that the first image G1 is a black image and the second image G2 is an image having a white paper color of the printing medium 5 onto which no ink is applied, a boundary region G12 illustrated in both FIG. 6 and FIG. 7 will be described.

Figure 8:
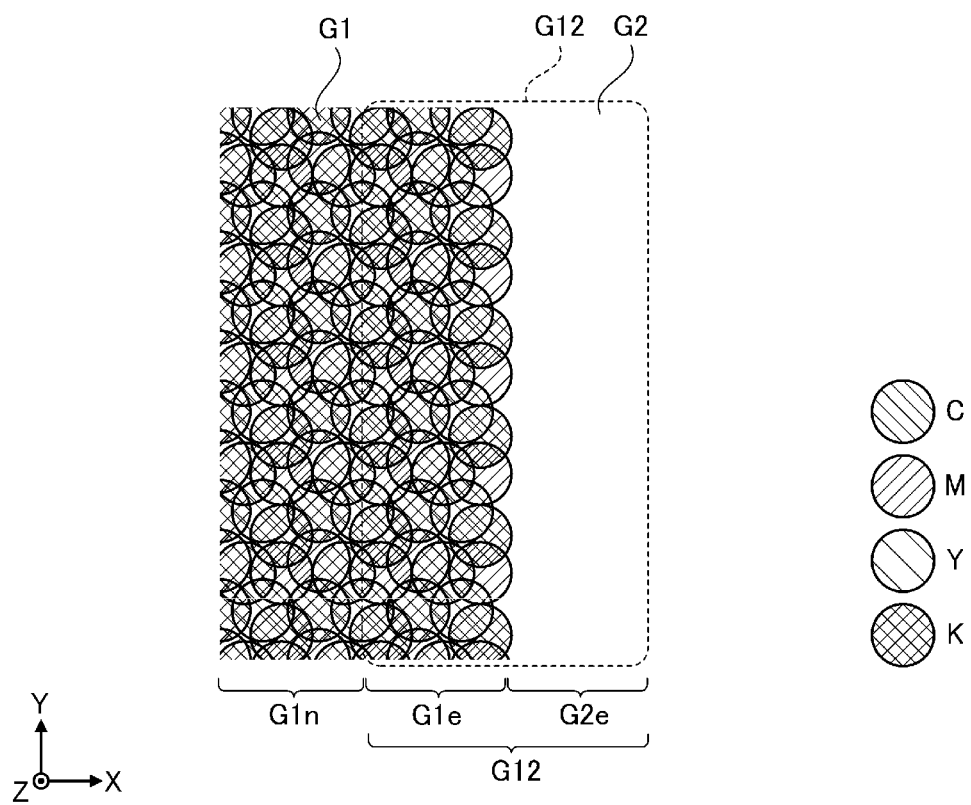
FIG. 8 is a conceptual diagram illustrating each of regions, namely, an end portion and a normal portion of a first image, an end portion of a second image that is adjacent to the end portion of the first image, and a boundary region formed by the end portion of the first image and the end portion of the second image.

Here, as illustrated in FIG. 8, the boundary region G12 is a region formed by an end portion G1e of the first image G1 and an end portion G2e, of the second image G2, that is adjacent to the end portion G1e and lighter than the end portion G1e. Further, the end portion G1e of the first image G1 and the end portion G2e of the second image G2 are regions corresponding to the pixel data positioned at end portions of the respective images, in the image data of the RGB color space obtained before the color conversion processing is performed.

As illustrated in FIG. 8, the first image G1 is formed by the inks of each of the CMY colors that constitute composite black, and by a black ink K.

Figure 9:
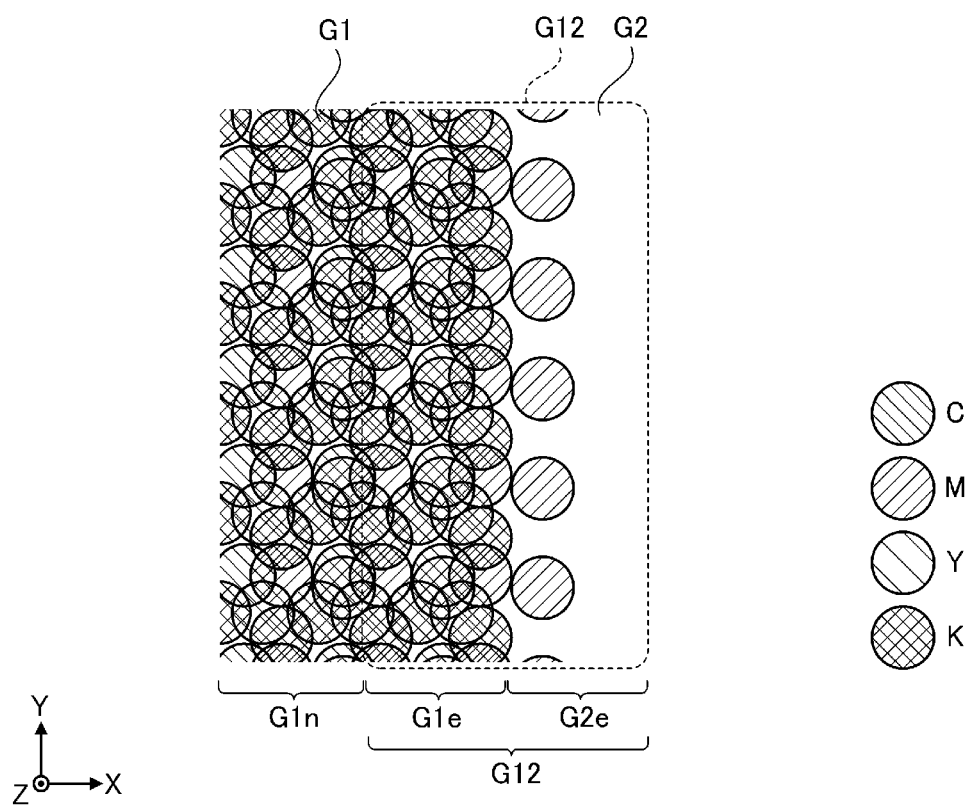
FIG. 9 is a conceptual diagram exemplifying a problem of the present disclosure caused by shifting of landing positions.

FIG. 9 illustrates a state in which only the landing positions of the ink droplets of magenta M, of the plurality of inks forming the first image G1, are shifted mainly in the positive X direction and protrude into the region of the end portion G2e of the second image G2. In such a case, when the gray scale value of the protruding magenta ink is large, that is, when the amount of ink of the protruding magenta is large, the magenta color becomes visible at an edge of the first image G1.

In contrast, when printing the boundary region G12, the printing apparatus 1 according to this embodiment performs specific ink discharge control to inhibit an unintended color from becoming visible, when performing discharge control of a specific color, such as the magenta M ink described above, that ends up becoming visible at the edge of the first image G1.

Specific examples of the specific ink discharge control will be described below.

1.1. Example 1

In the printing apparatus 1, when printing the boundary region G12, of the image G0 to be printed, formed by the end portion G1e of the first image G1 and the end portion G2e of the second image G2 that is lighter than the first image G1, in the discharge control of the specific ink in which the lightness when forming the end portion G1e of the first image G1 is lower than the lightness of the end portion G2e of the second image G2 by a predetermined value or more, the control unit 60 performs the specific ink discharge control to cause the number of dots per unit area constituting the end portion G1e of the first image G1 to be smaller than the number of dots per unit area constituting the normal portion G1n, of the first image G1, that is adjacent to the end portion G1e of the first image G1.

Here, the specific ink is an ink included in the plurality of inks for printing the end portion G1e of the first image G1, and is an ink for which the lightness when forming the end portion G1e of the first image G1 is lower than the lightness of the end portion G2e of the second image G2 by the predetermined value or more, simply by using the ink alone. As the predetermined value of the difference in lightness, a difference 20 in terms of lightness L* in the CIELAB color space, that is, in the CIE1976 (L*a*b*) color space is used as a preferable example.

For example, by comparing the lightness of the printing by the magenta M ink alone having the gray scale value forming the composite black in the end portion G1e of the first image G1 illustrated in FIG. 8, with the lightness of the end portion G2e of the second image G2, when a value of the lightness L* of the printing by the magenta M ink alone is lower than a value of the lightness L* of the end portion G2e of the second image G2 by 20 or more, the magenta M ink is determined to be the specific ink to be subject to the specific ink discharge control.

Note that CIE is an abbreviation for Commission Internationale de l'Eclairage, which means International Commission on Illumination.

With respect to such a specific ink, the control unit 60 performs the specific ink discharge control to cause the number of dots per unit area constituting the end portion G1e of the first image G1 to be smaller than the number of dots per unit area constituting the normal portion G1n, of the first image G1, that is adjacent to the end portion G1e of the first image G1. Note that the number of dots per unit area constituting the end portion G1e of the first image G1 is a value set as part of the print data, and does not refer to the number of dots actually formed as a result of discharging the ink droplets onto the printing medium 5.

Here, as a method for reducing the number of dots per unit area, it is preferable to use a method that reduces the number of dots without changing the lightness or a shade of the end portion G1e of the first image G1. Examples of the method for reducing the number of dots without changing the lightness or the shade of the end portion G1e of the first image G1 include a method for reducing the total number of dots by replacing the small dots with the medium dots or the large dots, or replacing the medium dots with the large dots while attempting not to change the total amount of ink per unit area of the small dots, the medium dots, and the large dots.

This processing is performed, for example, by switching the dot generation ratio table in the halftone processing. In other words, with respect to the normal portion G1n of the first image G1, the small dots, the medium dots, and the large dots are generated based on a normal dot generation ratio table, and with respect to the end portion G1e of the first image G1, the dots are generated based on a dot generation ratio table for the specific ink discharge control. The dot generation ratio table used in the specific ink discharge control is a table in which the numbers of larger dots are increased in order to reduce the total number of dots, compared with the normal dot generation ratio table. The dot generation ratio table used in the specific ink discharge control is prepared in advance by performing sufficient evaluation.

Note that as long as the printing quality falls within an acceptable range, a method may be adopted that ends up changing the lightness or the shade of the end portion G1e of the first image G1. For example, the dot generation ratio table employed in the specific ink discharge control may be a table in which the numbers of small dots, medium dots, and large dots generated are all reduced uniformly, compared with the normal dot generation ratio table.

1.2. Example 2

In the printing apparatus 1, when printing the boundary region G12, of the image G0 to be printed, in the discharge control of the specific ink described above, the control unit 60 performs the specific ink discharge control to cause the number of dots per unit area of a predetermined dot size constituting the end portion G1e of the first image G1 to be larger than the number of dots per unit area of the predetermined dot size constituting the normal portion G1n, of the first image G1, that is adjacent to the end portion G1e of the first image G1.

Here, the predetermined dot size is a dot size when the landing positions of the ink droplets are adjusted. This processing is performed, for example, by switching the dot generation ratio table in the halftone processing, in the same manner as in the case of Example 1. In other words, with respect to the normal portion G1n of the first image G1, the small dots, the medium dots, and the large dots are generated based on a normal dot generation ratio table, and with respect to the end portion G1e of the first image G1, the dots are generated based on a dot generation ratio table for the specific ink discharge control.

Specifically, since the shift in the landing positions is corrected by evaluating the formation positions of the large dots in the printing apparatus 1, the dot generation ratio table for the specific ink discharge control according to this example is a table in which the number of large dots generated is increased compared with the normal dot generation ratio table. Note that this table is preferably a table in which the number of large dots is increased without changing the total amount of ink per unit area, in the same manner as in the case of Example 1, in order to suppress changes in the lightness or the shade of the end portion G1e of the first image G1.

Note that when the dot size when the landing positions are adjusted is other than the large dot, and is, for example, the middle dot, the dot generation ratio table for the specific ink discharge control is a table in which the number of medium dots generated is increased compared with the normal dot generation ratio table.

1.3. Example 3

In the examples described above, in the discharge control of the ink droplets in the end portion G1e of the first image G1, the discharge control for the specific ink only is performed separately as the specific ink discharge control. Even when specifications of the specific ink discharge control, in other words, for example, even when specifications of the dot generation ratio table for the specific ink discharge control are determined based on sufficient evaluation, as a result of such a control, the end portion G1e of the first image G1 may become visible as a region having a color difference with respect to the normal portion G1n of the first image G1. In contrast, in this example, in order to reduce a degree of the color difference, discharge control different from the discharge control for the normal portion G1n of the first image G1 is also performed for the inks other than the specific ink.

In other words, in this example, in the discharge control of the ink droplets in the end portion G1e of the first image G1, in the specific ink discharge control for the specific ink, with respect to the discharge control of the inks other than the specific ink, among the plurality of inks for printing the end portion G1e of the first image G1, the control unit 60 performs hue correction control to cause the amount of inks other than the specific ink per unit area constituting the end portion G1e of the first image G1 to be different from the amount of inks other than the specific ink per unit area constituting the normal portion G1n of the first image G1.

The hue correction control is performed, for example, by switching the dot generation ratio table in the same manner as in the specific ink discharge control. In other words, with respect to the normal portion G1n of the first image G1, the small dots, the medium dots, and the large dots are generated based on the normal dot generation ratio table, and with respect to the end portion G1e of the first image G1, for the specific ink, the dots are generated based on the dot generation ratio table for the specific ink discharge control, and for the inks other than the specific ink, the dots are generated based on a dot generation ratio table for the hue correction. The dot generation ratio table for the hue correction is determined in advance based on evaluation sufficient to realize specifications for suppressing the color difference generated by the specific ink discharge control.

Note that when the first image G1 is a thin line or a character formed by thin lines, and especially when the thin line is formed by 1 to 2 pixels, since the entire first image G1 is subject to the specific ink discharge control, even when the hue correction control is performed, the first image G1 may become an image having a different hue from that of the original image. Therefore, in any one of the above-described examples, the control unit 60 preferably performs the specific ink discharge control when the first image G1 is an image including three or more pixels in a direction in which the pixels of the end portion G1e of the first image G1 and the pixels of the normal portion G1n of the first image G1 are aligned.

Figure 10:
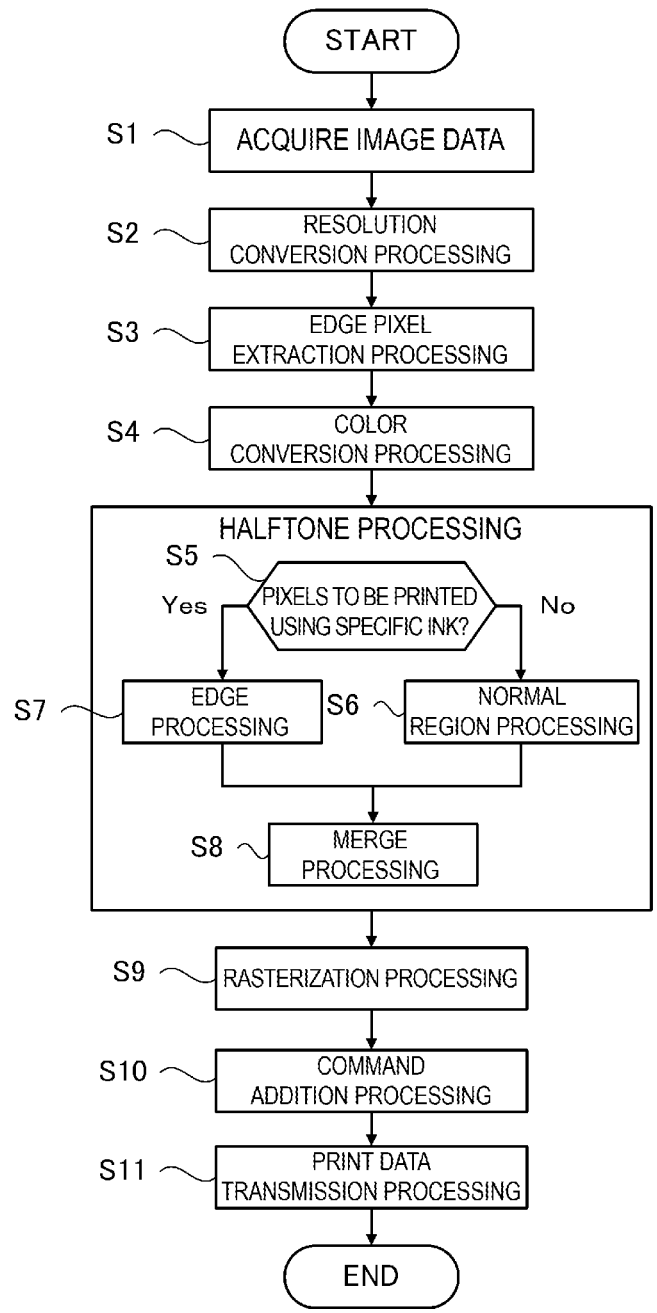
FIG. 10 is a flowchart of a printing method.

Next, an example of a printing method according to Example 1 or Example 2 will be described with reference to a flowchart illustrated in FIG. 10. The following processing is all performed in the image processing unit 110 under the control of the image control unit 111.

First, at step S1, image data to be printed is acquired. Specifically, using a function of the image processing application, the image data to be printed is acquired from an external electronic device via the general-purpose interface 120. Alternatively, the image data to be printed is selected from among the image data acquired in advance and stored in the storage unit 114.

Next, at step S2, the resolution conversion processing is performed on the acquired image data, and subsequently, at step S3, edge pixel extraction processing is performed.

The edge pixel extraction processing is, for example, processing for extracting edge pixels constituting an outline of an image to be printed such as a character or a line drawing based on the image data, and extracting an edge pixel region to be subject to edge processing, which will be described below. Specifically, RGB image data for which the resolution conversion has been completed is divided into each channel of red R, green G, and blue B, and edge pixels Rf, edge pixels Gf, and edge pixels Bf are extracted for each of the channels and merged. In the extraction of the edge pixels for each of the channels, when a difference in the gray scale value between a target pixel and one of the pixels surrounding the target pixel is greater than a predetermined determination threshold value, or when the gray scale value of the target pixel is greater than the gray scale value of the one of the pixels surrounding the target pixel that has exceeded the predetermined determination threshold value, the target pixel is determined to be the edge pixel. The predetermined determination threshold value used when extracting the edge pixels is, for example, 90 when the gray scale values range from 0 to 255.

The extracted edge pixels are stored in the memory 118.

Next, at step S4, the color conversion processing is performed on the image data on which the resolution conversion has been performed at step S2, and the image data of the RGB space is converted to the image data of the CMYK space.

Next, the halftone processing is performed on the image data of the CMYK space.

In the halftone processing, first, at step S5, a determination is made as to whether the pixel to be processed is a pixel that is subject to normal halftone processing or a pixel for which the printing is performed using the inks including the specific ink.

The determination as to whether the pixel to be processed is the pixel for which the printing is performed using the inks including the specific ink is made, first, by determining whether or not the pixel to be processed is the edge pixel that has been extracted at step S3, and when the pixel to be processed is the edge pixel, by determining whether or not the specific ink that is subject to the specific ink discharge control is included in the CMYK inks for forming the edge pixel.

The determination as to whether or not the specific ink is included in the CMYK inks for forming the edge pixel is made by comparing the lightness L* value of each monochrome image of CMYK having the gray scale value of each of CMYK forming the edge pixel, with the lightness L* value of surrounding pixels adjacent to the edge pixel, and by determining, as the specific ink, any of the CMYK inks indicating the lightness L* value lower than the lightness L* value of the surrounding pixels adjacent to the edge pixel by the predetermined value or more, that is, 20 or more. For example, when data of the edge pixel is CMYK (c1, m1, y1, k1) and data of the pixels adjacent to the edge pixel is CMYK (c2, m2, y2, k2), the lightness L* values corresponding to each of CMYK (c1, 0, 0, 0), CMYK (0, m1, 0, 0), CMYK (0, 0, y1, 0), CMYK (0, 0, 0, k1) are compared with the lightness L* value corresponding to CMYK (c2, m2, y2, k2), and the ink indicating the lightness L* value lower than the lightness L* value corresponding to CMYK (c2, m2, y2, k2) by 20 or more is determined to be the specific ink.

At step S6, the normal halftone processing is performed on the pixels that have been determined at step S5 to be the pixels to be subject to the normal halftone processing, in other words, the pixels other than the edge pixels and the edge pixels that have been determined not to include the specific ink in the CMYK inks for forming the edge pixels.

Further, at step S7, the halftone processing accompanying the edge processing is performed on the pixels that have been determined at step S5 to be the pixels for which the printing is performed using the inks including the specific ink.

The halftone processing accompanying the edge processing performed at step S7 is halftone processing performed using the dot generation ratio table for the specific ink discharge control, which is illustrated in the examples described above.

Next, at step S8, the image data generated at step S6 and the image data generated at step S7 are merged to complete the halftone processing.

Thereafter, after going through the rasterization processing at step S9 and the command addition processing at step 10, the print data is generated, and the print data is transmitted to the printing unit 100 at step S11, to perform the printing.

In other words, as the printing method according to this embodiment, in the edge processing at step S7, when the halftone processing is performed using the dot generation ratio table for the specific ink discharge control described in Example 1, in the printing of the boundary region G12, when discharging the specific ink, the number of dots per unit area constituting the end portion G1e of the first image G1 is caused to be smaller than the number of dots per unit area constituting the normal portion G1n, of the first image G1, that is adjacent to the end portion G1e of the first image G1.

Further, as the printing method according to this embodiment, in the edge processing at step S7, when the halftone processing is performed using the dot generation ratio table for the specific ink discharge control described in Example 2, in the printing of the boundary region G12, when discharging the specific ink, the number of dots per unit area of the predetermined dot size constituting the end portion G1e of the first image G1 is caused to be larger than the number of dots per unit area of the predetermined dot size constituting the normal portion G1n, of the first image G1, that is adjacent to the end portion G1e of the first image G1. Here, the predetermined dot size is the dot size when the landing positions of the ink droplets are adjusted.

Note that, in this embodiment, as described above, the specific ink discharge control, that is, the generation of the print data for performing the ink discharge control of the pixels for which the printing is performed using the inks including the specific ink, is performed by switching the dot generation ratio table in the halftone processing, but the present disclosure is not limited to this method. For example, a method for correcting the pixels may be adopted in which the normal halftone processing is once performed on all of the image data of the CMYK space generated by the color conversion processing at step S4, and then the specific ink discharge control is performed only for the pixels for which the printing is performed using the inks including the specific ink.

2. Effects of Embodiment

According to Example 1, the following effects can be obtained.

When printing the boundary region G12 formed by the end portion G1e of the first image G1 and the end portion G2e of the second image G2 that is lighter than the first image G1, in the discharge control of the specific ink, among the plurality of inks for printing the end portion G1e of the first image G1, that exhibits the lightness of the ink alone, when forming the end portion G1e of the first image G1, lower than the lightness of the end portion G2e of the second image G2 by the predetermined value or more, the control unit 60 performs the specific ink discharge control to cause the number of dots per unit area constituting the end portion G1e of the first image G1 to be smaller than the number of dots per unit area constituting the normal portion G1n, of the first image G1, that is adjacent to the end portion G1e of the first image G1. Thus, in the printing apparatus 1 in which the positions at which the ink droplets land may become shifted, the number of dots shifted from the end portion G1e of the first image G1 and formed in the region of the second image G2 is reduced.

In this specific ink discharge control, when the dot size of the specific ink for forming the end portion G1e of the first image G1 is not changed, since the amount of specific ink shifted from the end portion G1e of the first image G1 and applied to the region of the second image G2 is reduced, an unintended color is inhibited from becoming visible, due to the shift in the landing positions of the ink droplets, at the edge of the printed image.

Further, in the specific ink discharge control, when the gray scale value of the end portion G1e of the first image G1 is not changed, the dot size of the specific ink for forming the end portion G1e of the first image G1 is increased. Since the control for increasing the dot size is a control for increasing the size of the ink droplets, compared with a case where the ink droplets are small, the ink droplets become less susceptible to wind or the like, and a flying passage of the ink droplets is stabilized. Thus, an extent to which the ink droplets become shifted from the end portion G1e of the first image G1 and landing in the region of the second image G2 is reduced. As a result, an unintended color is inhibited from becoming visible, due to the shift in the landing positions of the ink droplets, at the edge of the printed image.

Further, according to Example 2, when printing the boundary region G12 formed by the end portion G1e of the first image G1 and the end portion G2e of the second image G2 that is lighter than the first image G1, in the discharge control of the specific ink, among the plurality of inks for printing the end portion G1e of the first image G1, that exhibits the lightness of the specific ink alone, when forming the end portion G1e of the first image G1, lower than the lightness of the end portion G2e of the second image G2 by the predetermined value or more, the control unit 60 performs the specific ink discharge control to cause the number of dots per unit area of the predetermined dot size constituting the end portion G1e of the first image G1 to be larger than the number of dots per unit area of the predetermined dot size constituting the normal portion G1n, of the first image G1, that is adjacent to the end portion G1e of the first image G1. Here, the predetermined dot size is the dot size when the landing positions of the ink droplets are adjusted. Thus, in the printing apparatus 1 in which the positions at which the ink droplets land may become shifted, the number of dots shifted from the end portion G1e of the first image G1 and formed in the region of the second image G2 is reduced. As a result, an unintended color is inhibited from becoming visible, due to the shift in the landing positions of the ink droplets, at the edge of the printed image.

Further, according to Example 3, when performing the specific ink discharge control, in the discharge control of the inks other than the specific ink, among the plurality of inks for printing the end portion G1e of the first image G1, the control unit 60 performs the hue correction control to cause the amount of inks other than the specific ink per unit area constituting the end portion G1e of the first image G1 to be different from the amount of inks other than the specific ink per unit area constituting the normal portion G1n of the first image G1. As a result of performing the specific ink discharge control, the hue of the end portion G1e of the first image G1 may become different from the hue of the normal portion G1n of the first image G1. By performing the hue correction control, a degree of the difference in the hue can be reduced.

Further, the control unit 60 preferably performs the specific ink discharge control when the first image G1 is an image including three or more pixels in the direction in which the pixels of the end portion G1e of the first image G1 and the pixels of the normal portion G1n of the first image G1 are aligned. In this case, since the first image G1 is the image including three or more pixels in the direction in which the pixels of the end portion G1e of the first image G1 and the pixels of the normal portion G1n of the first image G1 are aligned, when the specific ink discharge control is performed, at least one pixel of the normal portion G1n is secured as the first image G1, on which the specific ink discharge control is not performed. Thus, even when the first image G1 is an image formed by a fine line or a fine point, a significant deterioration of the printing quality due to the specific ink discharge control is suppressed.

Further, according to the printing method of Example 1, when printing the boundary region G12 formed by the end portion G1e of the first image G1 and the end portion G2e of the second image G2 that is lighter than the first image G1, in the discharge of the specific ink, among the plurality of inks for printing the end portion G1e of the first image G1, that exhibits the lightness of the ink alone, when forming the end portion G1e of the first image G1, lower than the lightness of the end portion G2e of the second image G2 by the predetermined value or more, the number of dots per unit area constituting the end portion G1e of the first image G1 is caused to be smaller than the number of dots per unit area constituting the normal portion G1n, of the first image G1, that is adjacent to the end portion G1e of the first image G1. Thus, in the printing apparatus 1 in which the positions at which the ink droplets land may become shifted, the number of dots shifted from the end portion G1e of the first image G1 and formed in the region of the second image G2 is reduced.

In this printing method, when the dot size of the specific ink for forming the end portion G1e of the first image G1 is not changed, since the amount of specific ink shifted from the end portion G1e of the first image G1 and applied to the region of the second image G2 is reduced, an unintended color is inhibited from becoming visible, due to the shift in the landing positions of the ink droplets, at the edge of the printed image.

Further, in this printing method, when the gray scale value of the end portion G1e of the first image G1 is not changed, the dot size of the specific ink for forming the end portion G1e of the first image G1 is increased. Since the control for increasing the dot size is a control for increasing the size of the ink droplets, compared with a case where the ink droplets are small, the ink droplets become less susceptible to wind or the like, and a flying passage of the ink droplets is stabilized. Thus, an extent to which the ink droplets become shifted from the end portion G1e of the first image G1 and landing in the region of the second image G2 is reduced. As a result, an unintended color is inhibited from becoming visible, due to the shift in the landing positions of the ink droplets, at the edge of the printed image.

Further, according to the printing method of Example 2, when printing the boundary region G12 formed by the end portion G1e of the first image G1 and the end portion G2e of the second image G2 that is lighter than the first image G1, in the discharge of the specific ink, among the plurality of inks for printing the end portion G1e of the first image G1, that exhibits the lightness of the ink alone, when forming the end portion G1e of the first image G1, lower than the lightness of the end portion G2e of the second image G2 by the predetermined value or more, the number of dots per unit area of the predetermined dot size constituting the end portion G1e of the first image G1 is caused to be larger than the number of dots per unit area of the predetermined dot size constituting the normal portion G1n, of the first image G1, that is adjacent to the end portion G1e of the first image G1. Here, the predetermined dot size is the dot size when the landing positions of the ink droplets are adjusted. Thus, in the printing apparatus 1 in which the positions at which the ink droplets land may become shifted, the number of dots shifted from the end portion G1e of the first image G1 and formed in the region of the second image G2 is reduced. As a result, an unintended color is inhibited from becoming visible, due to the shift in the landing positions of the ink droplets, at the edge of the printed image.

Note that, in this embodiment, the predetermined value of the difference in lightness for setting the specific ink to be subject to the specific ink discharge control is set to be 20 in terms of the lightness L* value, but the predetermined value is not limited to this value. It is preferable that the predetermined value be determined as appropriate in accordance with the degree of the shift in the landing positions of the ink droplets in the printing apparatus 1 and a degree of the printing quality required.

Further, in this embodiment, the printing unit 100 is described as being the inkjet printer that performs the printing on the long printing medium 5, which is supplied in the state of being wound in the roll shape, but the printing medium is not limited to the printing medium 5 wound in the roll shape, and may be a sheet-like single paper, or the like. When the sheet-like single paper is used, the supply unit 51 is replaced, for example, with a configuration provided with a supply mechanism including a separator for supplying the sheet one at a time, and additionally, the printing medium storage unit 52 is replaced, for example, with a configuration provided with a storage tray for storing the paper discharged after the printing, and the like. Further, in this embodiment, the printing unit 100 is described as having a configuration of a serial head type inkjet printer, but the printing unit 100 may be a line head type inkjet printer.

What is claimed is:

1. A printing apparatus comprising:
   a head configured to discharge an ink droplet; and
   a control unit configured to perform discharge control of the head, wherein
   when printing a boundary region formed by an end portion of a first image and an end portion of a second image lighter than the first image, in specific ink discharge control of a specific ink, among a plurality of inks for printing the end portion of the first image, that exhibits lightness, when forming the end portion of the first image, lower than lightness of the end portion of the second image by at least a predetermined value, the control unit performs specific ink discharge control to cause a number of dots per unit area constituting the end portion of the first image to be smaller than a number of dots per unit area constituting a normal portion, of the first image, adjacent to the end portion of the first image.

2. The printing apparatus according to claim 1, wherein
   when performing the specific ink discharge control, in discharge control of an ink other than the specific ink, among the plurality of inks for printing the end portion of the first image, the control unit performs hue correction control to cause an amount of the ink other than the specific ink per unit area constituting the end portion of the first image to be different from an amount of the ink other than the specific ink per unit area constituting the normal portion of the first image.

3. The printing apparatus according to claim 1, wherein the control unit performs the specific ink discharge control when the first image is an image including three or more pixels in a direction in which pixels of the end portion of the first image and pixels of the normal portion of the first image are aligned.

4. A printing apparatus comprising:
   a head configured to discharge an ink droplet; and
   a control unit configured to perform discharge control of the head, wherein
   when printing a boundary region formed by an end portion of a first image and an end portion of a second image lighter than the first image, in specific ink discharge control of a specific ink, among a plurality of inks for printing the end portion of the first image, that exhibits lightness, when forming the end portion of the first image, lower than lightness of the end portion of the second image by at least a predetermined value, the control unit performs specific ink discharge control to cause a number of dots per unit area of a predetermined dot size constituting the end portion of the first image to be larger than a number of dots per unit area of the predetermined dot size constituting a normal portion, of the first image, adjacent to the end portion of the first image, and
   the predetermined dot size is a dot size when a landing position of the ink droplet is adjusted.

5. A printing method for performing printing using a discharged ink droplet, the method comprising:
   when printing a boundary region formed by an end portion of a first image and an end portion of a second image lighter than the first image, causing a number of dots per unit area constituting the end portion of the first image to be smaller than a number of dots per unit area constituting a normal portion, of the first image, adjacent to the end portion of the first image, in discharge of a specific ink, among a plurality of inks for printing the end portion of the first image, that exhibits lightness, when forming the end portion of the first image, lower than lightness of the end portion of the second image by at least a predetermined value.

6. A printing method for performing printing by discharging an ink droplet, the method comprising:
   when printing a boundary region formed by an end portion of a first image and an end portion of a second image lighter than the first image, causing a number of dots per unit area of a predetermined dot size constituting the end portion of the first image to be larger than a number of dots per unit area of the predetermined dot size constituting a normal portion, of the first image, adjacent to the end portion of the first image, in discharge of a specific ink, among a plurality of inks for printing the end portion of the first image, that exhibits lightness, when forming the end portion of the first image, lower than lightness of the end portion of the second image by at least a predetermined value, wherein
   the predetermined dot size is a dot size when a landing position of the ink droplet is adjusted.

* * * * *